United States Patent Office 2,926,163
Patented Feb. 23, 1960

2,926,163

PREPARATION OF Δ$^{5,7}$-3-HYDROXY-STEROIDS

William G. Dauben, Berkeley, and Robert A. Micheli, Alameda, Calif., and Jerome F. Eastham, Palatka, Fla.

No Drawing. Application August 25, 1952
Serial No. 306,294

7 Claims. (Cl. 260—239.55)

This invention is concerned generally with the preparation of steroid compounds unsaturated in the 5:6 and 7:8 positions of the cyclopentanopolyhydrophenanthrene nucleus. More particularly, it relates to a novel process for preparing Δ$^{5,7}$-3-hydroxy-cyclopentanopolyhydrophenanthrene compounds starting with the corresponding Δ$^5$-3-hydroxy-cyclopentanopolyhydrophenanthrene compound. The Δ$^{5,7}$-3-hydroxy-cyclopentanopolyhydrophenanthrene compounds thus obtained are valuable as intermediates in the synthesis of steroid hormones such as cortiscosterone, cortisone and Compound F.

In accordance with the present invention, a Δ$^{4,6}$-3-keto-cyclopentanopolyhydrophenanthrene compound (Compound 1 hereinbelow) is reacted with an acylating agent to produce the corresponding Δ$^{3,5,7}$-3-acyloxy-cyclopentanopolyhydrophenanthrene compound (Compound 2), which is then reacted with a reducing agent to form the corresponding Δ$^{5,7}$-3-hydroxy-cyclopentanopolyhydrophenanthrene compound (Compound 3). The reactions indicated hereinabove may be chemically represented, insofar as the chemical changes occurring in rings A and B are concerned, as follows:

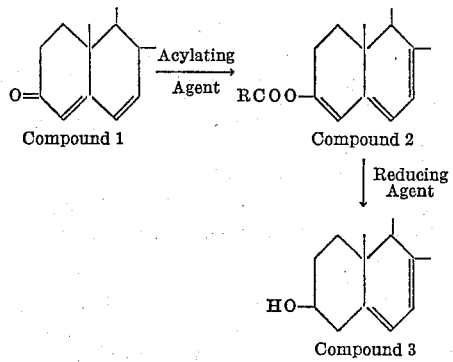

wherein R is an acyl radical.

The Δ$^{4,6}$-3-keto-cyclopentanopolyhydrophenanthrene compounds which we ordinarily employ as starting materials are those having a sterol side chain attached to the carbon atom in the 17-position of the molecule such as: Δ$^{4,6}$-3-keto-cholestadiene, Δ$^{4,6,22}$-3-keto-stigmastatriene, a bile acid side chain attached to the 17-carbon atom such as Δ$^{4,6}$-3-keto-choladienic acid, a degraded bile acid side chain attached to the 17-carbon atom such as Δ$^{4,6}$-3-keto-bisnorcholadienic acid, a 17-carboxyl substituent such as Δ$^{4,6}$-3-keto-etiocholadienic acid, a 17-acetyl substituent such as Δ$^{4,6}$-3,20-diketo-pregnadiene, a sapogenin side chain such as Δ$^{4,6}$-3-keto-isospirostadiene, Δ$^{4,6}$-3-keto-spirostadiene, and the like.

In preparing these Δ$^{4,6}$-3-keto-cyclopentanopolyhydrophenanthrene compounds, we ordinarily start with readily available Δ$^5$-3-hydroxy-cyclopentanopolyhydrophenanthrene compounds such as cholesterol, stigmasterol, Δ$^5$-3-hydroxy-cholenic acid, Δ$^5$-3-hydroxy-bisnorcholenic acid, Δ$^5$-3-hydroxy-etiocholenic acid, Δ$^5$-3-hydroxy-pregnene, diosgenin, and the like. These Δ$^5$-3-hydroxy-cyclopentanopolyhydrophenanthrene compounds are reacted, in benzene solution, with benzoquinone in the presence of aluminum tertiary butoxide, thereby forming the corresponding Δ$^{4,6}$-3-keto-cyclopentanopolyhydrophenanthrene compounds, which are utilized as starting materials in our process.

In accordance with the present invention, these Δ$^{4,6}$-3-keto-cyclopentanopolyhydrophenanthrene compounds are then reacted with an acylating agent comprising a carboxylic acid anhydride in the presence of a carboxylic acyl halide thereby forming the corresponding Δ$^{3,5,7}$-3-acyloxy-cyclopentanopolyhydrophenanthrene compound. The acylating agent utilized in our process is critical since the reaction between Δ$^{4,6}$-3-keto-cyclopentanopolyhydrophenanthrene compounds and other acylating agents such as isopropenyl acetate-sulfuric acid or an acyl chloride-dimethyl aniline results in the formation of the unwanted isomeric Δ$^{2,4,6}$-3-acyloxy-cyclopentanopolyhydrophenanthrene compounds. We usually prefer to utilize, as the carboxylic acid anhydride, an alkanoic anhydride such as acetic anhydride, propionic anhydride, butyric anhydride, valeric anhydride, caproic anhydride or an aryl carboxylic acid anhydride such as benzoic anhydride, phthalic anhydride, and the like.

The carboxylic acid anhydride is utilized, as set forth hereinabove, in conjunction with a carboxylic acyl halide, as, for example, an alkanoyl halide such as acetyl chloride, acetyl bromide, propionyl chloride, propionyl bromide, butyryl chloride, butyryl bromide, valeryl chloride, valeryl bromide, and the like. It is important that the reaction be conducted under substantially anhydrous conditions, since the enol acylate, the Δ$^{3,5,7}$-3-acyloxy-cyclopentanopolyhydrophenanthrene compound, is unstable in the presence of water. A ratio of three to five equivalents of carboxylic acyl halide to one of the Δ$^{4,6}$-3-keto-cyclopentanopolyhydrophenanthrene compound appears to be optimum although the reaction can be carried out, if desired, using a ratio of 1 to 20 equivalents of the carboxylic acyl halide to one of the Δ$^{4,6}$-3-keto-cyclopentanopolyhydrophenanthrene compound. A large excess of the carboxylic acid anhydride is ordinarily utilized in the reaction since this compound acts as the solvent medium for the reaction. Additional inert solvents such as the hydrocarbon solvents toluene and benzene, or the halogenated hydrocarbon solvent, chloroform may be employed but, with the exception of chloroform, these apparently result in a lowering in yield of enol acylate. The time and temperature used for the acylation-enolization reaction are interdependent. Thus, at the temperature of reflux, that is about 95° C., the reaction is ordinarily complete in about 1 to 12 hours with 5 to 7 hours being the preferred heating time. At a temperature of about 75–80° C., the reaction can be effected in about 5 to 25 hours, with 15 hours being the optimum reaction time. The Δ$^{3,5,7}$-3-acyloxy-cyclopentanopolyhydrophenanthrene compound formed by the reaction is conveniently recovered by adding the warm reaction mixture to a cold lower alkanol such as methanol, ethanol, isopropanol, and the like, whereupon the Δ$^{3,5,7}$-3-acyloxy-cyclopentanopolyhydrophenanthrene compound precipitates and can be recovered by filtration. It may be further purified, if desired, by recrystallization from a solvent comprising a lower alkanol such as methanol-ether.

If preferred, instead of adding the carboxylic acyl halide, as such, to the reaction, we can utilize, along with the carboxylic acid anhydride, a compound which reacts with carboxylic acid anhydrides to form the corresponding carboxylic acyl halide as, for example, a hydrogen halide, such as hydrogen chloride or hydrogen bromide, or a polyvalent metal halide such as aluminum chloride, zinc chloride, or stannic chloride, whose halogen component has an atomic number below 40 and which can be characterized as a "Lewis acid" in accordance with G. N. Lewis' definition of acids and bases as set forth on pages 80–81 of the text "Advanced Organic Chemistry" by G. B. Wheland (Wiley & Sons, second edition, 1949). Thus, the acylating agents which we ordinarily utilize in the practice of our invention are the carboxylic acid anhydrides in admixture with a halogen compound selected from the group which consists of acyl halides, hydrogen halides, and polyvalent metal halides whose halogen component has an atomic number below 40 and which can be characterized as "Lewis acids."

As set forth hereinabove the direction of enol acylation of the $\Delta^{4,6}$-3-keto-cyclopentanopolyhydrophenanthrene compound is a function of the acylating system used to effect the reaction; the critical system resulting in the formation of the desired $\Delta^{3,5,7}$-3-acyloxy-cyclopentanopolyhydrophenanthrene compound being a carboxylic acid anhydride in the presence of a carboxylic acyl halide (either added as such or formed in situ by reaction between the carboxylic acid anhydride and halogen compound). While the reaction can be carried out using an acylating agent consisting solely of a carboxylic acid anhydride and a carboxylic acyl halide (or compound yielding the latter in situ), it has been found that addition of an amine to the reaction mixture results, in many cases, in improved yields of the enol acylate. We ordinarily utilize a tertiary amine such as pyridine, collidine, dimethylaniline, triethylamine, and the like.

The $\Delta^{3,5,7}$ - 3 - acyloxy-cyclopentanopolyhydrophenanthrene compounds produced in accordance with our novel acylation procedure include:

$\Delta^{3,5,7}$-3-acyloxy-cholestatriene,
$\Delta^{3,5,7}$-3-acetoxy-cholestatriene,
$\Delta^{3,5,7}$-3-propionoxy-cholestatriene,
$\Delta^{3,5,7}$-3-butyroxy-cholestatriene,
$\Delta^{3,5,7}$-3-benzoxy-cholestatriene,
$\Delta^{3,5,7,22}$-3-acyloxy-stigmastatetraene,
$\Delta^{3,5,7,22}$-3-acetoxy-stigmastatetraene,
$\Delta^{3,5,7,22}$-3-propionoxy-stigmastatetraene,
$\Delta^{3,5,7,22}$-3-butyroxy-stigmastatetraene,
$\Delta^{3,5,7,22}$-3-benzoxy-stigmastatetraene,
$\Delta^{3,5,7}$-3-acyloxy-cholatrienic acid,
$\Delta^{3,5,7}$-3-acetoxy-cholatrienic acid,
$\Delta^{3,5,7}$-3-benzoxy-cholatrienic acid,
$\Delta^{3,5,7}$-3-acyloxy-bisnorcholatrienic acid,
$\Delta^{3,5,7}$-3-acetoxy-bisnorcholatrienic acid,
$\Delta^{3,5,7}$-3-benzoxy-bisnorcholatrienic acid,
$\Delta^{3,5,7}$-3-acyloxy-etiocholatrienic acid,
$\Delta^{3,5,7}$-3-acetoxy-etiocholatrienic acid,
$\Delta^{3,5,7}$-3-benzoxy-etiocholatrienic acid,
$\Delta^{3,5,7}$-3-acyloxy-pregnatriene,
$\Delta^{3,5,7}$-3-acetoxy-pregnatriene,
$\Delta^{3,5,7}$-3-propionoxy-pregnatriene,
$\Delta^{3,5,7}$-3-butyroxy-pregnatriene,
$\Delta^{3,5,7}$-3-benzoxy-pregnatriene,
$\Delta^{3,5,7}$-3-acyloxy-spirostatriene,
$\Delta^{3,5,7}$-3-acetoxy-spirostatriene,
$\Delta^{3,5,7}$-3-benzoxy-spirostatriene,
$\Delta^{3,5,7}$-3-acyloxy-isospirostatriene,
$\Delta^{3,5,7}$-3-acetoxy-isospirostatriene,
$\Delta^{3,5,7}$-3-propionoxy-isospirostatriene,
$\Delta^{3,5,7}$-3-butyroxy-isospirostatriene,
$\Delta^{3,5,7}$-3-benzoxy-isospirostatriene.

When $\Delta^{4,6}$-3-keto-isospirostadiene is reacted with a carboxylic acid anhydride and a carboxylic acyl halide in the presence of a tertiary amine such as pyridine, in addition to the enol-acylation reaction, the characteristic sapogenin side-chain is cleaved and a furostatetraene (pseudosapogenin) is formed such as $\Delta^{3,5,7,20}$-3,26-diacyloxy-furostatetraene, $\Delta^{3,5,7,20}$-3,26-diacetoxy-furostatetraene, $\Delta^{3,5,7,20}$-3,26-dibenzoxy-furostatetraene, and the like. This cleaved side-chain may be reconverted to the sapogenin structure by reaction with a reducing agent.

The $\Delta^{3,5,7}$ - 3 - acyloxy - cyclopentanopolyhydrophenanthrene compound is then reacted with a reducing agent to form the corresponding $\Delta^{5,7}$-3-hydroxy-cyclopentanopolyhydrophenanthrene compound, such as $\Delta^{5,7}$-3-hydroxy-cholestadiene,
$\Delta^{5,7,22}$-3-hydroxy-stigmastatriene,
$\Delta^{5,7}$-3-hydroxy-choladienic acid,
$\Delta^{5,7}$-3-hydroxy-bisnorcholadienic acid,
$\Delta^{5,7}$-3-hydroxy-etiocholadienic acid,
$\Delta^{5,7}$-3,20-dihydroxy-pregnadiene,
$\Delta^{5,7}$-3-hydroxy-isospirostadiene,
$\Delta^{5,7}$-3-hydroxy-spirostadiene, and the like. We ordinarily utilize, as the reducing agent, an alkali metal borohydride such as sodium borohydride, potassium borohydride, lithium borohydride, an alkali metal aluminum hydride such as lithium aluminum hydride, and the like. We prefer to use, as the reducing agent, an alkali metal borohydride, particularly sodium borohydride. The reduction is conveniently conducted by bringing the reactants together in a liquid medium substantially inert to the reactants as, for example, a lower alkanol, tetrahydrofurane, an alkyl ether, dioxane, and the like. We ordinarily prefer to employ a mixture of ether and a lower alkanol such as methanol, or a mixture of methanol and dioxane as the liquid medium. The reaction temperature may range from −10° C. to 100° C. although we ordinarily prefer to conduct the reaction at a temperature between about 0 and 25° C. The $\Delta^{5,7}$-3-hydroxy-cyclopentanopolyhydrophenanthrene compound is conveniently recovered by diluting the reaction mixture with water, extracting the aqueous mixture with a water-immiscible solvent such as ether and evaporating the ethereal extract.

The $\Delta^{5,7}$ - 3 - hydroxy - cyclopentanopolyhydrophenanthrene compounds obtained by our improved process can be converted to steroid hormones such as cortisone in accordance with the methods set forth in the articles by Chamberlin et al. (JACS, 73, 2396 (1951)) and Chemerda et al. (JACS, 73, 4052 (1951)).

The following examples illustrate methods of carrying out the present invention, but it is to be understood that these examples are given for purposes of illustration and not of limitation.

*Example 1*

A mixture of one gram of $\Delta^{4,6}$-3-keto-isospirostadiene, 1 ml. of acetyl chloride, and 5 ml. of acetic anhydride was heated in the dark under a nitrogen atmosphere at a temperature of 75–80° C. for a period of eighteen hours. At the end of the reaction period the reaction mixture was subjected to distillation in vacuo, thereby evaporating the volatile components to give crude $\Delta^{3,5,7}$-3-acetoxy-isospirostatriene.

The residual $\Delta^{3,5,7}$-3-acetoxy-isospirostatriene was dissolved in 40 ml. of dioxane and 60 ml. of methanol, and the solution was cooled to a temperature of about 5° C. The cold solution was added to a solution of 2 g. of sodium borohydride in 40 ml. of methanol and 3 ml. of water, while maintaining the temperature of the mixture at about 5° C. The resulting solution was stirred at a temperature of about 2° C. for a period of six hours and allowed to stand at a temperature of about 5° C. for an additional forty-eight hour period. Seventy-five milliliters of a 5% aqueous solution of sodium hydroxide was added, and the methanol was evaporated from the aqueous methanol solution in vacuo. The concentrated solution was poured into excess dilute aqueous hydrochloric acid solution, and the aqueous acid solution was extracted with ether. The ethereal extract was dried and the ether evaporated therefrom to give $\Delta^{5,7}$-3-hydroxy-isospirostadiene; ultraviolet absorption spectrum: $\lambda$ max. 2700, 2820, 2925; E% 74, 80, 55.

Example 2

Five-tenths of a gram of $\Delta^{4,6}$-3-keto-isospirostadiene were added to 2.5 ml. of acetic anhydride (which had been previously distilled over sodium acetate and magnesium sulfate) containing 0.5 ml. of acetyl chloride (which had been previously distilled over 2,4,6-collidine). The resulting mixture was heated on a steam bath (at a temperature of 75–80° C.), in a nitrogen atmosphere, for a period of sixteen and one-half hours. The warm reaction mixture was poured, with cooling and stirring, into 5 ml. of cold methanol. The crystalline precipitate, which formed on standing, was filtered, and recrystallized by dissolving in ether and boiling off the ether with concurrent addition of methanol. Two recrystallizations gave substantially pure crystalline $\Delta^{3,5,7}$-3-acetoxy-isospirostadiene; M.P. 185–188° C.

Example 3

To 0.25 g. of $\Delta^{4,6}$-3-keto-isospirostadiene was added 10 ml. of acetic anhydride and 1.74 ml. of a solution of hydrogen chloride in chloroform (0.128 g. HCl/ml. CHCl$_3$, 1 equiv. of HCl). The resulting mixture was heated under reflux overnight. The solvents were evaporated from the reaction mixture in vacuo and the residual material was triturated with methanol. The insoluble solid material was recovered by filtration and dried to give partially purified $\Delta^{3,5,7}$-3-acetoxy-isospirostatriene; M.P. 165–175° C.; ultraviolet absorption spectrum: $\lambda$ max. 3020, 3140, 3290; E% 373, 428, 284.

Example 4

A mixture of 0.5 g. of $\Delta^{4,6}$-3-keto-cholestadiene, 2.5 ml. of acetic anhydride and 0.5 ml. of acetyl chloride was heated on a steam bath (temperature 75–80° C.) in the dark for a period of about fifteen hours. (Spectroscopic analysis of the reaction mixture showed a conversion to $\Delta^{3,5,7}$-3-acetoxy-cholestatriene of 90% of theory.) The hot crude reaction mixture was poured slowly, with stirring, into 8 ml. of cold methanol and the resulting mixture was cooled to about 0–5° C. The crystalline material which separated was recovered by filtration, washed with cold methanol, and recrystallized from ether-methanol solution to give 0.35 g. of substantially pure $\Delta^{3,5,7}$-3-acetoxy-cholestatriene; M.P. 91–93° C.

Upon reacting the $\Delta^{3,5,7}$-3-acetoxy-cholestatriene with sodium borohydride in accordance with the procedure set forth in Example 1 hereinabove, there is obtained $\Delta^{5,7}$-3-hydroxy-cholestadiene.

Example 5

To a mixture of 0.5 ml. of acetyl chloride, 0.1 ml. of pyridine and 2.5 ml. of acetic anhydride was added 0.5 g. of $\Delta^{4,6}$-3-keto-isospirostadiene. The resulting mixture was heated on a steam bath (temperature approximately 75–80° C.), in a nitrogen atmosphere, for a period of about fifteen hours. The volatile components were evaporated from the reaction mixture in vacuo, and the residual material was triturated with methanol to give a crystalline product. This material was recrystallized twice from methanol to give substantially pure $\Delta^{3,5,7,20}$-3,26-diacetoxy-furostatetraene, M.P. 100–102° C.

*Analysis.*—Calc'd for C$_{31}$H$_{42}$O$_5$: C, 75.27; H, 8.56. Found: C, 75.52; H, 8.39.

One gram of $\Delta^{3,5,7,20}$-3,26-diacetoxy-furostatetraene was dissolved in 40 ml. of dioxane and 60 ml. of methanol, the solution was cooled to a temperature of about 5° C., and the cold solution was added to a solution of 1.6 g. of sodium borohydride in 40 ml. of methanol and 3 ml. of water. The resulting solution was stirred at a temperature of about 2° C. for a period of about eight hours, and was then allowed to stand overnight at room temperature. The reaction mixture was diluted with water, the aqueous solution was evaporated in vacuo to about one-half its volume, and then extracted with ether. The ethereal extract was dried and the ether evaporated therefrom in vacuo to give a crude product which was demonstrated by ultraviolet absorption data to contain the corresponding $\Delta^{5,7}$-diene; $\lambda$ max. 2725, 2815, 2930; E% 140, 150, 93.

Various changes and modifications may be made in carrying out the present invention without departing from the spirit and scope thereof. Insofar as these changes and modifications are within the purview of the annexed claims they are to be considered as part of our invention.

We claim:

1. The process which comprises reacting a $\Delta^{4,6}$-3-keto-cyclopentanopolyhydrophenanthrene having a C–17 side chain selected from the group consisting of bile acid side chain, degraded bile acid side chain, sapogenin side chain, cholesterol side chain, stigmasterol side chain, carboxyl side chain and acetyl side chain, with a carboxylic acid anhydride in the presence of the corresponding carboxylic acyl halide under substantially anhydrous conditions to form the corresponding $\Delta^{3,5,7}$-3-acyloxy-cyclopentanopolyhydrophenanthrene.

2. The process which comprises reacting $\Delta^{4,6}$-3-keto-isospirostadiene with acetic anhydride in the presence of acetyl chloride under substantially anhydrous conditions to produce $\Delta^{3,5,7}$-3-acetoxy-isospirostatriene.

3. The process which comprises reacting $\Delta^{4,6}$-3-keto-cholestadiene with acetic anhydride in the presence of acetyl chloride under substantially anhydrous conditions to produce $\Delta^{3,5,7}$-3-acetoxy-cholestatriene.

4. The process which comprises reacting a $\Delta^{3,5,7}$-3-acyloxy-cyclopentanopolyhydrophenanthrene having a C–17 side chain selected from the group consisting of bile acid side chain, degraded bile acid side chain, cholesterol side chain, stigmasterol side chain, carboxyl side chain and acetyl side chain, with a reducing agent to produce $\Delta^{5,7}$ - 3 - hydroxy - cyclopentanopolyhydrophenanthrene.

5. The process which comprises reacting a $\Delta^{3,5,7}$-3-acyloxy-cyclopentanopolyhydrophenanthrene having a C–17 side chain selected from the group consisting of bile acid side chain, degraded bile acid side chain, cholesterol side chain, stigmasterol side chain, carboxyl side chain and acetyl side chain, with an alkali metal borohydride to produce $\Delta^{5,7}$-3 - hydroxy - cyclopentanopolyhydrophenanthrene.

6. The process which comprises reacting a $\Delta^{3,5,7}$-3-acyloxy-cyclopentanopolyhydrophenanthrene having a C–17 side chain selected from the group consisting of bile acid side chain, degraded bile acid side chain, cholesterol side chain, stigmasterol side chain, carboxyl side chain and acetyl side chain, with an alkali metal aluminum hydride to produce $\Delta^{5,7}$-3-hydroxy-cyclopentanopolyhydrophenanthrene.

7. The process which comprises reacting $\Delta^{3,5,7}$-3-acetoxy-cholestratriene with sodium borohydride to produce $\Delta^{5,7}$-3-hydroxy-cholestadiene.

References Cited in the file of this patent

UNITED STATES PATENTS 2,576,311   Schlesinger _____ Nov. 27, 1951

FOREIGN PATENTS 103,896   Australia _____ May 4, 1938